Patented Sept. 14, 1948

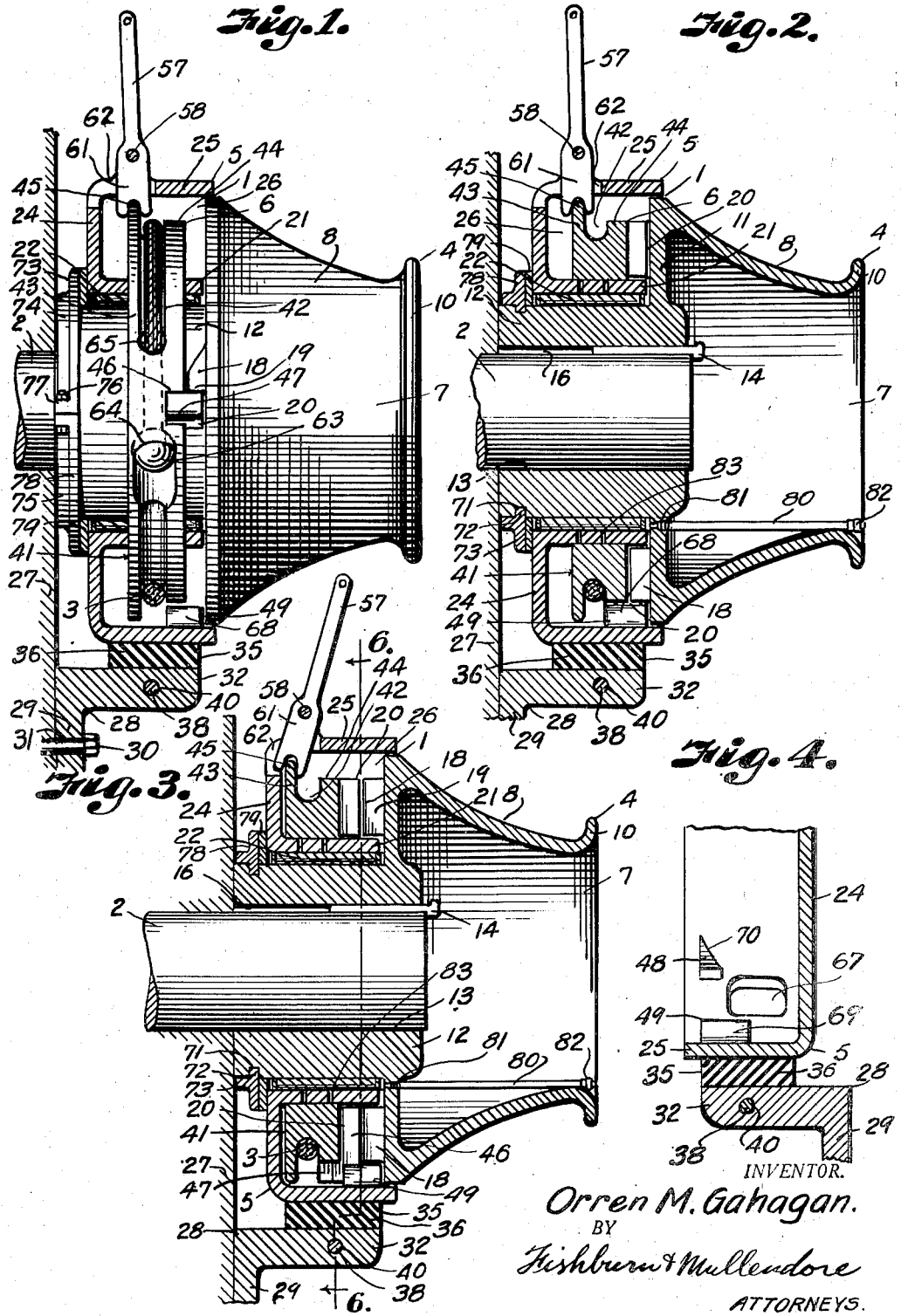

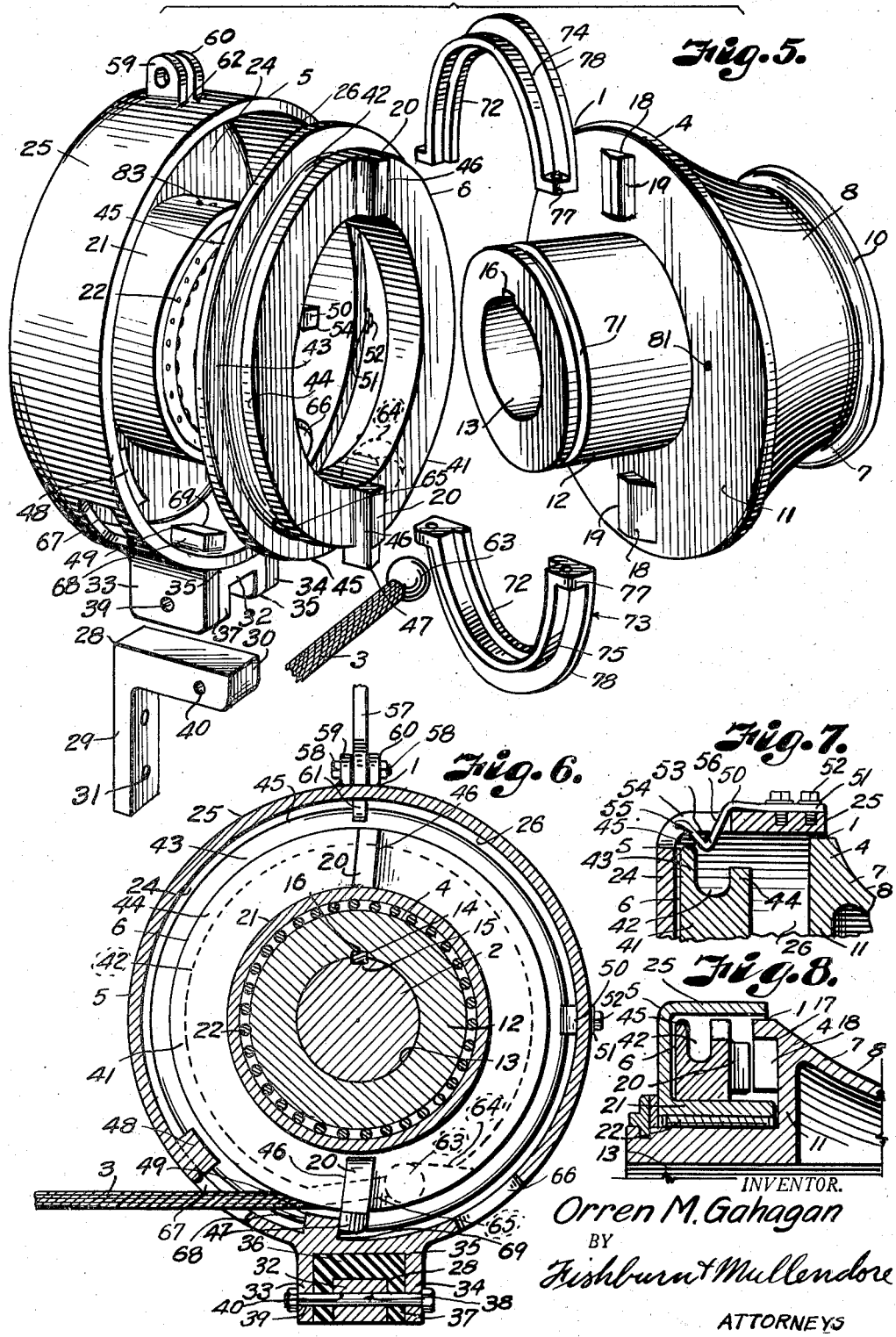

2,449,376

UNITED STATES PATENT OFFICE 2,449,376

CATHEAD

Orren M. Gahagan, Dallas, Tex.

Application March 23, 1945, Serial No. 584,341

3 Claims. (Cl. 254—173)

This invention relates to a device commonly known as a cathead for operating the jerk line employed in setting up and breaking the tool joints of drill pipe, couplings of casing, and similar threaded connections encountered in well drilling operations.

The principal objects of the invention are to provide a device of this character of sturdy, light weight, compact construction capable of withstanding shock incidental to application of power applied to the jerk line and the resultant recoil incidental to breaking loose of a threaded joint.

Other objects of the invention are to provide such device with a resilient mounting for taking up shocks ordinarily absorbed by the equipment on which the device is mounted; to provide a cathead which includes a driving member adapted for rigid mounting on a shaft of a draw works and having a bearing portion journaled within a control housing that encloses the jerk line sheave and on which the sheave is rotatably and slidably mounted for engagement with the driving member; to provide a simple sheave shift and control mechanism; to provide an arrangement of clutch lugs between the jerk line sheave and driving member for obtaining the desired operating interval between the time the jerk line sheave is shifted to driven position and application of rotating power thereto by the driving member; to provide sheave throw out, check, and rest elements in cooperation with one of the clutch lugs on the jerk line sheave; to provide a jerk line sheave having an annular shifting rim thereon formed as a continuation of one side flange of the jerk line sheave; to provide a throw out element on the control housing shaped for facilitating the disengagement of the clutch lugs; to provide a single shift lever for the jerk line sheave that may be located in any position circumferentially of the control housing on which it is mounted; and to provide a simple latch mechanism for retaining the jerk line sheave in engaged and disengaged positions.

Another object of the invention is to provide a simple and secure connection of the jerk line with the jerk line sheave and which is readily connected and removed therefrom.

It is also a further object of the invention to provide a cathead spool having shape for resisting wear of a catline thereon and to provide space for accommodating the driving clutch lugs inset within the body of the spool which results in a more compact and light weight construction.

In accomplishing these and other objects of the invention hereinafter pointed out, I have provided improved structure, the preferred forms of which are illustrated in the accompanying drawings wherein:

Fig. 1 is a side elevational view of a cathead constructed in accordance with the present invention, parts being shown in section to better illustrate parts enclosed thereby.

Fig. 2 is a vertical section through the cathead showing the jerk line sheave in position to be engaged by the driving member.

Fig. 3 is a similar view showing the jerk line sheave out of driving position.

Fig. 4 is a fragmentary section through a portion of the control housing and the mounting therefor, particularly illustrating the sheave disengaging, check, and rest elements in relation with the opening through which the jerk line is threaded onto the jerk line sheave.

Fig. 5 is a perspective view of the parts of the cathead shown in disassembled spaced relation to better illustrate the construction thereof.

Fig. 6 is a cross section through the cathead on the line 6—6 of Fig. 3.

Fig. 7 is a fragmentary sectional view particularly illustrating the latch for retaining the jerk line sheave in engaged and disengaged positions thereof.

Fig. 8 is a fragmentary section through a device constructed in accordance with the present invention and which includes a modified form of catline spool that results in a shorter over-all length and provides a stronger structure.

Referring more in detail to the drawings:

1 designates a device commonly known as a cathead adapted to be applied to the line shaft 2 of a draw works of a drilling rig, and which is used in operating the jerk line 3 in combination with wrenches or tongs for making up and breaking joints of casing, tool joints of drill pipe, and like threaded connections incidental to drilling practices.

In the illustrated instance, the cathead 1 includes a driving member 4, a control housing 5, and a sheave 6 for the jerk line 3. The driving member 4 is illustrated including a catline spool 7 of substantially frustro-conical shape to provide an annular face 8 tapering from the inner side to the outer side, preferably in a curve as indicated (Figs. 1, 2, 3, and 5) and on which a conventional catline (not shown) is adapted to be wound incidental to certain drilling operations. The outer side of the cathead terminates in an annular flange 10 to retain the catline thereon and the opposite or base side connects by a disk-like web portion or annulus 11 with a hub 12. The hub 12 has an axial bore 13 whereby the cathead is mounted on the line shaft 3 and connected therewith through a key 14 inserted within a way 15 of the line shaft and a registering way 16 of the hub 12 as shown in Figs. 2 and 3. If desired, the web portion 11 may be inset within the base portion of the cathead as indicated at 17 (Fig. 8) for a purpose to be later described. Formed on the outer face of the web 11 and projecting therefrom are one or more lugs 18 shown on the drawings as two in number and diametrically arranged with respect to each other. The lugs 18 have driving faces 19 arranged in the forward direction of rotation of the cathead and adapted to engage complementary lugs 20 on the jerk line sheave 6 later described. The rear faces of the lugs 18 are sloped as at 18' to shift the sheave for carrying the lugs 2 out of the path of the lugs 18, should the rotation of the drive shaft be reversed.

The control housing 5 includes a hub or sleeve portion 21 sleeved over the hub or bearing portion 12 of the driving member and which cooperates therewith in mounting an anti-friction bearing 22 preferably including a circumferential series of rollers. The anti-friction bearing reduces torque on the control housing and provides free rotation of the driven member therein. The housing 5 also includes a web portion 24 extending circumferentially of the sleeve portion 21 at one end thereof and which carries a lateral circumferential flange 25 preferably of a width to overlap the web portion 11 of the driving member to form an annular chamber 26 for housing the jerk line sheave 6.

The housing 5 is anchored to a fixed part of the draw works; for example, an adjacent jackpost 27 thereof by bracket 28 having a leg or plate portion 29 adapted to be secured to the jackpost by fastening devices such as bolts 30 that extend through suitable openings 31. Extending laterally from the leg 29 is an arm 32 positioned between spaced ears 33 and 34 on the flange of the housing and which cooperate with the arm to embrace a shock absorbing pad 35. The shock absorbing pad is preferably of channel shape to provide a web portion 36 engaged between the flange of the housing and the upper face of the arm 32 and flange portions 37 engaged between the ears 33 and 34 and the respective sides of the arm as best shown in Fig. 6. If desired, a fastening device such as a bolt 38 may be passed through opening 39 in the ears and registering opening 40 of the arm of the bracket to retain the shock absorbing pad and cooperate with the hub portion 12 of the driven member in maintaining a substantially fixed position for the control housing.

The jerk line sheave 6 includes a ring-like body 41 having an inner diameter to be freely and slidably rotatable on the sleeve portion 21 of the control housing 5 and having suitable width and thickness for accommodating a groove 42 part way therearound and in which the jerk line 3 is adapted to operate as later described, the dimensions of the sheave being such as to limit the mass of the sheave to that necessary in accommodating the line groove and providing the necessary strength so as to reduce the inertia thereof when disengaged from the driving member as later described. The groove 42 provides side flanges 43 and 44 on the respective sides of the sheave and one of the flanges, for example, the flange 43 is extended radially to provide an annular shaft lever engaging portion or rim 45 so as to simplify the shifting mechanism later described.

The lugs 20 previously mentioned are formed on the side of the sheave adjacent the lugs 19 and are arranged according to the spacing thereof as best shown in Figs. 5 and 6, the lugs having faces 46 adapted to be engaged by the faces 19. One of the lugs 20 extends beyond the peripheral face of the flange 44 as indicated at 47 to engage a throw out element 48 and a check and rest element 49. The length of the sleeve portion 21 is such that when the jerk line sheave is positioned adjacent the web portion 24 of the housing the lugs 20 on the sheave are clear of the lugs 19 on the driven member. The jerk line sheave, therefore, has two positions relatively to the longitudinal axis of the sleeve 21, that is, engaged and disengaged positions, which positions are maintained by a latch 50, best shown in Fig. 7. The latch 50 comprises a spring leaf 51 having one end anchored to the exterior face of the flange 25 by fastening devices such as screws 52. The other or free end of the leaf terminates in a substantially V-shaped latch head 53 that operates through an opening 54 in the flange of the control housing and has converging sides 55 and 56 (Fig. 7) to engage the respective sides of the rim portion 45 of the sheave flange 43. In order to manually shift the jerk line sheave from the disengaged position shown in Figs. 3 and 7 to driven position, a lever 57 is pivotally mounted on a pin 58 carried by ears 59 and 60 located at any convenient point about the circumference of the control housing. The lever 57 has a substantially fork-shaped head 61 that projects through a slot 62 in the control housing at a point intermediate the ears 59 and 60 and straddles the rim portion 45 of the flange 43 as clearly shown in Figs. 1, 2, and 3. The outer end of the lever may be connected in any suitable manner with a hand or foot control (not shown) located conveniently for the driller.

In order to provide a readily detachable connection of the jerk line 3 with the sheave, one end of the jerk line carries a knob 63 suitably fixed thereto and which engages in a socket 64 in the periphery of the sheave near one of the lugs 20. The other end of the groove 42 is also connected with the socket through a bore 65.

To facilitate threading of the jerk line in the sheave, the flange of the control housing has an opening 66 in a side thereof of sufficient size to freely pass the knob 63 when the socket 64 is registered therewith. When the socket 64 of the sheave is registered with the opening 66, it is obvious that the free end of the jerk line or that to be attached to the tong, is readily passed through the opening 66, socket 64, and bore 65 to lie within the groove of the sheave. After passing into the groove, the free end of the line is drawn through an opening 67 of the flange to seat the knob 63 in the socket 64.

In order that the entire circumference of the sheave may be utilized in applying power to the jerk line and to provide a maximum stroke therefor, the check and rest 49 is located intermediate the openings 66 and 67, as shown in Figs. 5 and 6. The check and rest element 49 is formed by a lug preferably integral with the control housing and which is shaped to provide a check face 68 facing the opening 67 and a rest face 69 facing the opening 66, which faces are adapted to be engaged by the projecting portion 47 of the lug 20.

The throw out element 48 is also preferably integral with the flange and includes a substantially wedge-shaped lug having one side located parallel with the web 11, and one side 70 tapering toward the web 24 for shifting of the pulley out of driven position when the extension 47 engages therewith. Upon release of driving engagement, the sheave is free to rotate to its original position under recoil of the jerk line or by a pull on the jerk line when the operator backs up the tongs, in which position the lug extension 47 rests against the rest face 69 of the lug 49.

In order to retain the control housing in proper position on the bearing portion of the hub 12 of the driving member, the hub 12 has an annular groove 71 in the end thereof adjacent the jackpost 27 to receive an inwardly extending rib 72 on a ring 73. The ring is preferably formed in sections 74 and 75 (Fig. 5) adapted to be placed separately in the groove 71 of the hub 12 and secured in position by fastening devices 76 extended through registering ears 77 on the ends of the respective sections as best shown in Figs. 1 and 5. The ring also includes an outwardly extending flange portion 78 spaced from the outer face of the web portion 24 of the control housing to accommodate a spacer ring 79 therebetween. The roller bearing surfaces, including the bearing surface of the sheave and sleeve of the control housing, are supplied with lubricant through a duct 80 extending within the cathead portion of the driving member and having one end threaded into a port 81 registering with the roller bearing as shown in Figs. 2 and 3. The opposite end of the duct is suitably attached to the outer end of the cathead and carries a pressure fitting 82. The space occupied by the roller bearing is connected with the bearing face of the sheave through ports 83 so that lubricant from the bearing space passes therethrough.

In assembling an apparatus constructed as described, the roller bearing 22 may be applied within the sleeve portion 21 of the control housing 5 or to the hub portion 12 of the driving member. The jerk line sheave 6 is then passed over the sleeve portion 21 so that it enters the annular space 26. The shift lever 57 may then be applied so that the forked end 61 thereof engages over the rim 45 of the sheave. The control housing containing the sheave is sleeved upon the hub portion 12 of the driving member 4 and is followed by the spacer ring 79. The sections 74 and 75 of the retaining ring 73 are then applied so that the ribs 72 thereon engage in the annular groove 71 of the hub 12 and are secured by passing the fastening devices 76 through the ear portions 77 thereof to complete the assembly of the unit.

In assembling the unit on a line shaft 2 of a draw works, the key 14 is removed from the way 15 and the hub portion 12 of the driving member 4 is sleeved on the projecting end of the shaft 2 so that the way 16 thereof registers with the way 15 in the line shaft. The key 14 is then driven into position to retain the assembly. The arm 2 of the bracket 28 is inserted in position between the ears 3 and 34 and retained by the fastening device 38. The plate portion 29 of the bracket 28 is then secured to the jackpost 27 by the fastening devices 30. The sheave 6 is positioned within the control housing 5 so that the lug 20 having the end 47 engages the rest face 69 of the stop lug 49 in which position the socket 64 registers with the opening 66 and the bore 65 substantially aligns with the opening 67. The end of the jerk line 3 which is to be attached to the tongs may then be threaded through the opening 66, socket 64, bore 65, into the portion of the groove adjacent the outlet end of the bore and through the opening 67 to seat the knob 63 in the socket 64 as shown in Figs. 1 and 6. The jerk line is then attached to the tongs as in usual practice and the lever 57 is suitably connected with the control adjacent the driller's position.

When a draw works is in operation, the shaft 2 is rotating the member 4; however, when the sheave 6 is in disengaged position shown in Fig. 3, the lugs 18 on the driving member will pass the lugs 20 on the sheave 6. The sheave is retained in this position by the latch head 53 engaging the rim 45 of the sheave flange 43.

The parts are shown in their normal at rest position in Figs. 3 and 6 with the lug 20 on the sheave resting against the rest face 69 of the stop lug 49. Any slack in the jerk line is drawn up upon application of the tongs so that when a joint is to be broken or tightened, power of the driving member 4 is immediately effective in imparting a pull on the jerk line. This is effected by shifting the lever 57 to move the jerk line sheave 6 into position as shown in Figs. 1 and 2 so that the lugs 20 thereon are in position to be engaged by the planeting lugs 18 on the driving member 4. The sheave 6 is retained in this position by the latch head 53 engaging the opposite side of the rim 45 of the sheave flange 43. Upon engagement of the lugs 18 of the driving member with the lugs 20 on the sheave 6, the sheave 6 is rotated in a counter-clockwise direction (Fig. 6) to effect wrapping of the jerk line about the periphery on the sheave. The sudden application of power applied to the line effects a snap on the line sufficient to crack or tighten the joint as the case may be. The sheave 6 continues its rotation until the extension lug 47 engages the face 70 of the throw out element 48 after which rotation of the sheave is checked by the extension 47 of the sheave striking the check face 68. After disengagement, the sheave is kept free of the lugs 18 since it is re-engaged by the side 55 of the latch 50. The sheave is now free to return to its normal or resting position incidental to recoil in the jerk line or back up of the tongs.

With the form of spool shown in Fig. 8, the inset web at the base of the spool locates the lugs 18 within the limits of the spool and results in a shorter over-all length and a lighter weight unit.

From the foregoing it is obvious that I have provided a cathead of sturdy, light weight, and compact construction providing ample stroke necessary in cracking or tightening a joint and which is capable of providing lasting and satisfactory service.

What I claim and desire to secure by Letters Patent is:

1. A device of the character described including a driving member having a bearing portion and an annulus at one end of the bearing portion, sheave control means carried on the bearing portion of the driving member, a sheave rotatable about the bearing portion and slidable to and from the annulus, interengaging means on said annulus and sheave, means carried on the control means for sliding the sheave to effect engagement of said interengaging means, throw out means on the control means engageable with a part on the sheave to effect disengagement of said interengaging means after a predetermined rotation of the sheave by said driving member, a jerk line having one end anchored to the sheave for winding about the sheave when the sheave is rotated by the driving member and to effect reverse rotation of the sheave after disengagement of the interengaging means, stop means on the control means for limiting the extent of rotation of the sheave about said bearing portion, a bracket for supporting the sheave control means, spaced ears on the sheave control means for receiving a portion of said bracket therebetween, and resilient means between said portion of the bracket and said ears for absorbing shocks resulting from engagement of said part on the sheave with said stop means.

2. In an apparatus of the character described, a support, a shaft rotatable on the support, a driving member on the shaft having a bearing portion, a sheave control means mounted on the bearing portion of the driving member, a driven member rotatable about said bearing portion, means selectively connecting the driven member with the driving member, means for effecting automatic disengagement of said members, means for mounting the control means on the support including a bracket, a channel-like resilient member straddling the bracket, spaced ears on the control means engaging the resilient member, and a fastening device extending through said ears and bracket.

3. A device of the character described including a driving member having a bearing portion extending coaxially from a side thereof, a sheave control housing carried on the bearing portion, a sheave rotatable about the bearing portion and slidable axially thereof, said sheave having an annular flange at one side of a line groove in said sheave, means extending laterally from the driving member and sheave on facing sides thereof and adapted to interengage when the sheave is shifted laterally from an idle position toward the driving member to effect interengagement of said laterally extending means, a lever having a forked end engaging the annular flange, means for pivotally mounting the lever on the control housing to effect said shift of the sheave, throwout means on the control housing engageable with the means on the sheave to effect disengagement of said laterally extending means after a predetermied rotation of the sheave by the driving member and to effect return of said sheave to idle position, a jerk line having one end anchored to the sheave for winding about the sheave when the sheave is rotated by the driving member and to effect reverse rotation of the sheave upon disengagement of said laterally extending means, stop means on the control housing for limiting the extent of reverse rotation of the sheave about said bearing portion, and a latch carried by the control housing and engaging over said flange to retain the sheave in said idle position during any turning of the sheave incidental to manipulation of the jerk line prior to release of said latch from engagement with said flange.

ORREN M. GAHAGAN.

REFERENCES CITED

The following references are of record in the file of this patent:

UNITED STATES PATENTS

| Number | Name | Date |
|---|---|---|
| Re. 18,789 | Gahagan | Apr. 4, 1933 |
| 1,629,662 | Hill et al. | May 24, 1927 |
| 1,755,728 | Foster | Apr. 22, 1930 |
| 2,124,129 | Therolf | July 19, 1938 |
| 2,138,175 | Keys | Nov. 29, 1938 |
| 2,314,733 | Owen | Mar. 23, 1943 |